March 25, 1924.
L. STOLTENBERG
POTATO PICKING MACHINE
Filed Jan. 9, 1922     4 Sheets-Sheet 4
1,487,821
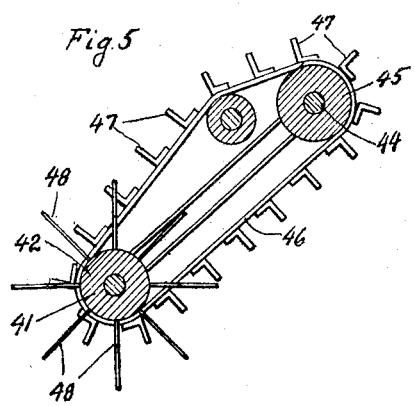
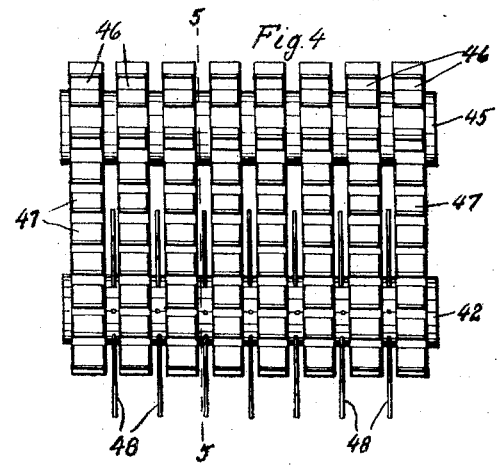
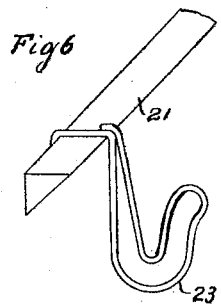
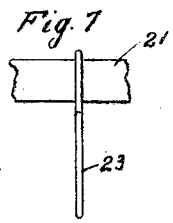
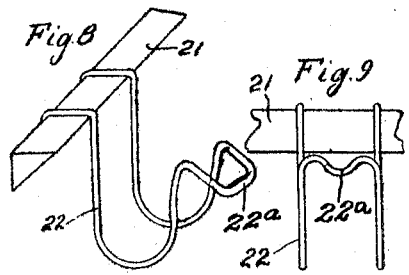
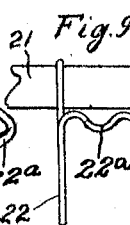
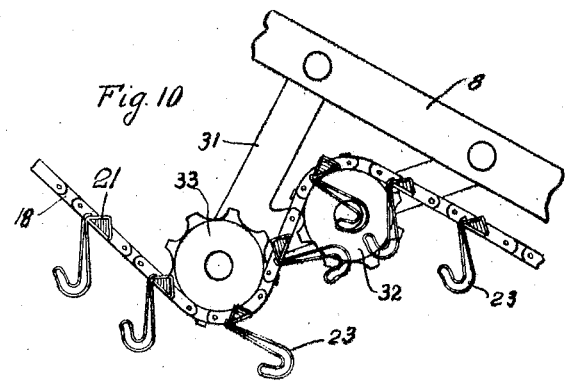
INVENTOR.
Louis Stoltenberg,
BY Walter N Haskell.
his ATTORNEY.

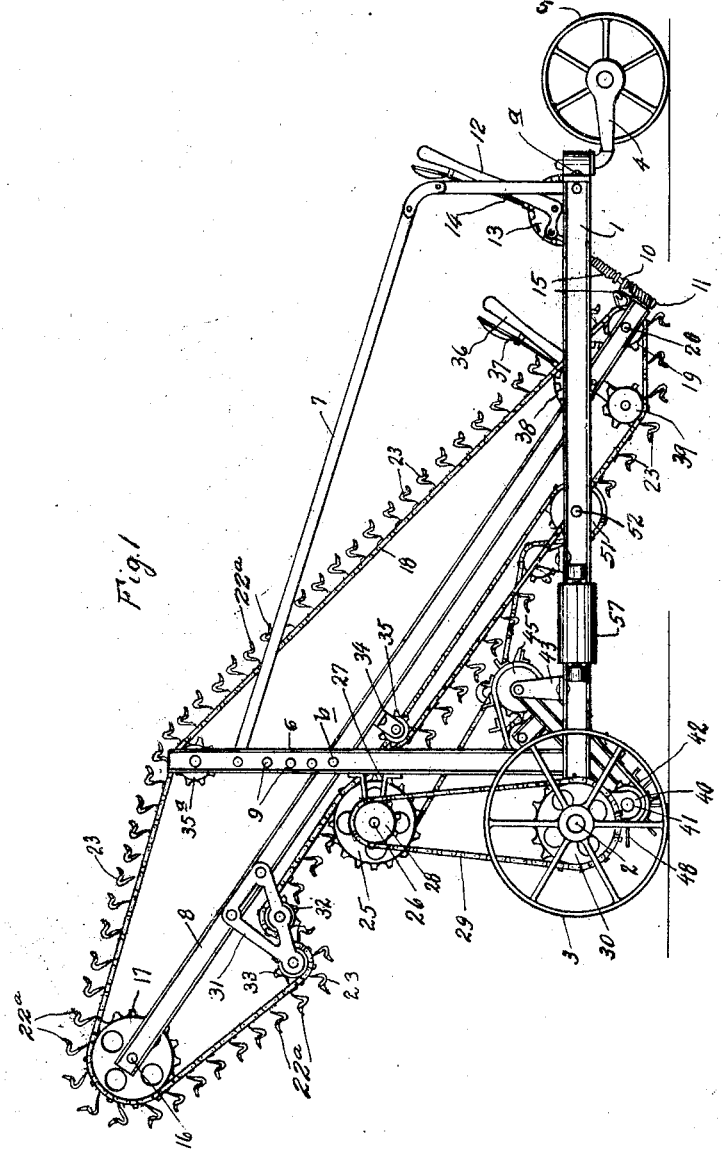

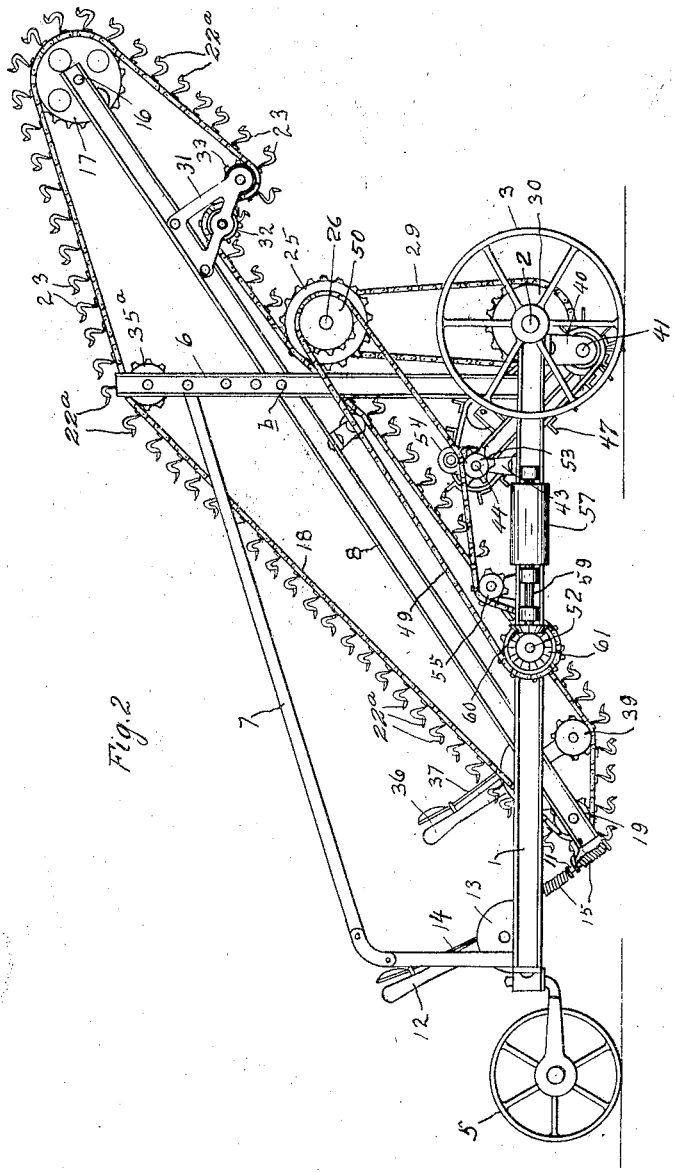

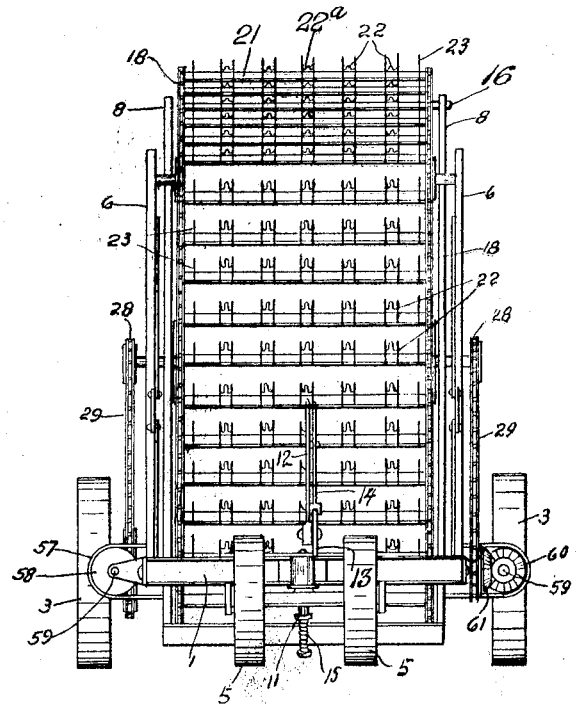

Patented Mar. 25, 1924.

1,487,821

UNITED STATES PATENT OFFICE.

LOUIS STOLTENBERG, OF WALCOTT, IOWA.

POTATO-PICKING MACHINE.

Application filed January 9, 1922. Serial No. 527,903.

*To all whom it may concern:*

Be it known that I, LOUIS STOLTENBERG, a citizen of the United States, residing at Walcott, in the county of Scott and State of Iowa, have invented certain new and useful Improvements in Potato-Picking Machines, of which the following is a specification.

My invention has reference to potato picking machines, and has for its purpose to pick up a quantity of potatoes as they have been plowed or dug from the row, and deliver them into a wagon or truck. This is accomplished by means of pickers and carriers, which separate the potatoes from the soil and bear them upwardly to a point where they are delivered to the wagon. This is done while the machine and wagon are in movement, and for convenience in operation the machine is attached immediately behind the wagon, and propelled thereby.

In some cases, where a considerable acreage of potatoes has been planted, the operation of picking up the potatoes consumes considerable time and labor, and the potatoes are more or less injured and destroyed in the handling. By the use of the present device a great quantity of the tubers can be picked up, ready for transportation, very speedily and expeditiously, and without injury thereto.

The operation of the machine tends to thoroughly clean the dirt from the potatoes, and special means are provided for clearing away the vines and rubbish, so that they will not interfere with the work of picking up the potatoes.

In the drawings:

Fig. 1 shows the machine in side elevation, from one side thereof.

Fig. 2 is a similar view, from the opposite side of the machine.

Fig. 3 is a rear elevation thereof.

Fig. 4 is a rear view of the rubbish elevating devices.

Fig. 5 is a vertical section on the broken line 5—5 of Fig. 4.

Fig. 6 shows one of the fingers 23 in perspective.

Fig. 7 is an edge view thereof.

Fig. 8 is a perspective of one of the carriers 22.

Fig. 9 is a front view thereof.

Fig. 10 is a detail of the dumping mechanism for the carriers 22.

The numeral 1 indicates the frame of the machine, in one end of which is rotatably mounted an axle 2, on the ends of which are carrying-wheels 3. Pivoted in the other end of the frame, as at $a$, is a yoke 4, in which is rotatably mounted a pair of additional carrying wheels 5, which respond readily to the action of the forward part of the machine, and aid in a turning thereof in either direction. At the forward end of the machine there is fixed to the frame 1 a pair of posts 6, supported by braces 7, extending to the rear end of the frame. Frame pieces 8 are pivoted on the inside of said posts, as at $b$, a series of openings 9 being provided in each of the posts to allow for vertical adjustment of said frames.

Centrally of its rear end the frame 8 has attached thereto an angle plate 10, perforated to permit the free passage of a rod 11, the upper end of which is connected with the short end of a hand-lever 12, fulcrumed on a toothed segment 13, and provided with an operator's rod 14 to hold said lever in adjusted positions. By action of the hand-lever the rear end of the frame 8 can be raised or lowered, as desired, and held in the new position. In the upper end of the frame 8 is a shaft 16, upon which is rotatably mounted a pair of sprocket wheels 17, connected by a sprocket-chain 18, with sprocket-wheels 19 on a shaft 20 in the lower end of the frame. The chains 18 are united at regular intervals by angle-bars 21, to which are rigidly secured series of receptacles 22, preferably formed of wire, as shown each of said receptacles being formed with an outwardly projecting loop or finger $22^a$. At the ends of the bars are fingers 23, also formed of wire. The pockets 22 serve to pick up the potatoes in the manner hereinafter described, each of such pockets being capable of holding one potato of average size. The fingers 23 act as guards, and direct any straggling potatoes at the sides of the row toward the center, to be there picked up. The loops $22^a$ operate to root into the ground, loosening the potatoes, and working them upwardly into the pockets. The work will be more effectively done if the pockets on adjacent bars be arranged in alternating positions.

Movement is imparted to the chains 18 by means of sprocket-wheels 25, on a shaft 26, supported in bearings 27 fixed to the posts 6, said sprocket-wheels bearing against the lower faces of said chains. The shaft 26 is rotated by means of a sprocket-wheel 28, connected by a chain 29 with a sprocket-wheel 30 on the axle 2. When the machine is in movement rotation is imparted to the shaft 26 from the axle 2, in a direction to drive the chains 18 upwardly along the under side of the frame 8.

To the sides of the frame 8 are secured triangular frames 31, in which are rotatably supported small sprocket wheels 32 and 33, the chains 18 passing over the wheels 32 and under the wheels 33. This operates to upset the pockets 22, so that the contents thereof will be discharged downwardly. It is intended to connect the machine with the rear end of a wagon, as above mentioned, by which arrangement the potatoes would fall from the carriers into the rear end of the wagon box, from whence they could be shoveled or otherwise moved to the front end thereof, until the front part of the box had been filled.

On the under side of the frame 8 are bearings 34, on which are rotatably supported idler sprocket-wheels 35, which bear against the upper sides of the chains 18, and insure their engagement with the wheels 25. At the upper ends of the posts 6 the chains 18 pass over sprocket-wheels 35ª, rotatably mounted on the inner faces of said posts. Near the lower ends of the side pieces of the frame 8 are fulcrumed hand-levers 36, fitted with operator's rods 37, for engagement with the teeth of segments 38, fixed on the inside of the frame. On the lower ends of the levers 36 are rotatably mounted sprocket-wheels 39, which have a bearing on the upper sides of the chains 18. When the wheels 39 are properly adjusted their lower edges will be in line with the lower parts of the wheels 19, and the chains 18 will be caused to travel a little distance on a line parallel with the ground. During this part of their progress the pockets 22 will be passing thru the loose earth containing the potatoes, and becoming filled therewith.

Depending from the forward part of the main frame 1 is a pair of bearings 40, in which is rotatable a shaft 41, carrying a drum 42. Mounted on the frame is a pair of supports 43, in which is rotatable a shaft 44, carrying a similar drum 45. Passing around the drums 42 and 45 is a series of belts 46, each carrying a plurality of small shovels 47, and the lower drum is fitted between said belts with radial spikes 48. Movement is imparted to the shaft 44 by means of a sprocket-chain 49, connecting a sprocket-wheel 50 on the end of the shaft 26 with a similar wheel 51 on a shaft 52 rotatably mounted in the frame 1, and passing over a sprocket wheel 53 on the end of the shaft 44. The chain 49 is held in engagement with the wheel 53 by means of a roller 54 rotatably mounted above such wheel, said chain also passing over an idler wheel 55 mounted above the frame 1. In the forward movement of the machine the drums 42 and 45 are rotated, giving movement to the belts 46, causing the shovels on said belts, with the assistance of the spikes 48, to pick up any vines or other refuse in the path of the machine. Such refuse is then borne upwardly by the shovels, over the top of the drum 45, where it is dropped upon an endless apron 57, supported transversely of the machine on a pair of drums 58, (only one of which is shown) on shafts 59 rotatably mounted at the sides of the frame. On the rear end of one of said shafts is a bevel gear-wheel 60, in mesh with a similar wheel 61 on the end of the shaft 52. When the machine is being operated movement is imparted from the shaft 52 to the shaft 59, turning the drum thereon, and causing the apron 57 to have a continuous movement toward one side of the machine. The rubbish which falls upon such apron is thus carried toward that side of the machine and discharged. The path is thus kept clear, so that the vines and rubbish will not become entangled with the pockets 22.

The operation of the various parts of the machine has already been gone into so fully that it is not deemed necessary to give a recapitulation thereof. When it is desired to transport the machine from one point to another, the lower end of the frame 8 is raised by means of the lever 12, so as to clear any obstructions on the surface of the ground. When in action the springs 15 afford a yielding movement to said lower end of the frame 8, so that it will readily accommodate itself to inequalities of the earth.

What I claim as my invention, and desire to secure by Letters Patent, is:

1. A device of the class described, comprising a portable frame; elevating devices operatively mounted therein; a plurality of independent wire pockets rigidly attached to said elevating devices; wire fingers fixed to the edges of said elevating devices; and means for upsetting said pockets at a given point in the upward movement of said elevating devices.

2. A device of the class described, comprising a portable frame; an auxiliary frame swingingly supported therein in an inclined position; means for a yieldable support of the lower end of said auxiliary frame; elevating devices operatively mounted on said auxiliary frame; means for compelling the movement of said elevating devices for a short distance parallel with the earth near the lower end of said frame; independent carrying devices rigidly secured to said elevating devices; and means for upsetting said carrying devices at a given point in the movement of said elevating devices.

3. A device of the class described, comprising a portable frame; elevating devices operatively mounted therein; a plurality of wire pockets rigidly attached to said elevating devices, each provided with an outwardly projected loop adapted to loosen and elevate the potatoes into said pockets; and means for upsetting said carriers at a given point in the upward movement of said elevating devices.

In testimony whereof I affix my signature.

LOUIS STOLTENBERG.